US006128390A

United States Patent [19]

Kimura et al.

[11] Patent Number: 6,128,390

[45] Date of Patent: Oct. 3, 2000

[54] DATA PROCESSOR FOR FM MULTIPLEX BROADCAST

[75] Inventors: Kazuhiro Kimura, Fukaya; Shigeaki Hayashibe, Gunma-ken; Tatsuo Hiramatsu, Musashino, all of Japan

[73] Assignee: Sanyo Electric Co., Ltd., Osaka, Japan

[21] Appl. No.: 08/854,602

[22] Filed: May 12, 1997

[30] Foreign Application Priority Data

May 13, 1996 [JP] Japan .................................... 8-118032

[51] Int. Cl.[7] ........................................................ H04L 9/00

[52] U.S. Cl. ............................................ 380/268; 380/270

[58] Field of Search .................................... 380/9, 21, 28, 380/49, 255, 268, 270

[56] References Cited

U.S. PATENT DOCUMENTS

| | | | |
|---|---|---|---|
| 4,811,394 | 3/1989 | Ragavan et al. | 380/21 |
| 5,740,246 | 4/1998 | Saito | 380/21 |
| 5,784,462 | 7/1998 | Tomida et al. | 380/9 |
| 5,825,888 | 10/1998 | Kimura et al. | 380/49 |
| 5,835,499 | 11/1998 | Kimura et al. . | |
| 5,912,973 | 6/1999 | Hiramatsu et al. | 380/28 |

FOREIGN PATENT DOCUMENTS

| | | |
|---|---|---|
| 0682428A2 | 11/1995 | European Pat. Off. . |
| 0748073A1 | 12/1996 | European Pat. Off. . |
| 2732531 | 10/1996 | France . |
| 9-83390 | 3/1997 | Japan . |

*Primary Examiner*—Salvatore Cangialosi
*Attorney, Agent, or Firm*—Hogan & Hartson, LLP

[57] ABSTRACT

A second random number generator (102) sets a scramble key data included in a transmitted/received data to an initial value, and it generates predetermined second random numbers. A first random number generator (101) generates first random numbers from the second random numbers supplied by the second random number generator (102). The generation of the first random numbers by the first random number generator (101) is controlled by an output from a first control circuit (103). Since the output from the first control circuit (103) is changed in accordance with a service identification code SI, the first random numbers generated from the first random number generator (101) are changed. The first random numbers are input to a gate circuit (105) via a second control circuit (104). The second control circuit (104) inhibits the output of the first random numbers in accordance with the SI value. In such a manner, scrambling or descrambling is controlled in the gate circuit (105).

18 Claims, 9 Drawing Sheets

TRUTH TABLE OF FIRST CONTROL CIRCUIT (1) (Fig. 2)

| | IN THE CASE OF SI = 5 | | | | LOW-ORDER FOUR BITS OF DATA PACKET NUMBER | | | | OUTPUT FROM FIRST CIRCUIT | | | |
|---|---|---|---|---|---|---|---|---|---|---|---|---|
| | b1 | b2 | b3 | b4 | b23 | b24 | b25 | b26 | c1 | c2 | c3 | c4 |
| 1 - ① | 1 | 0 | 1 | 0 | 0 | 0 | 0 | 0 | 1 | 0 | 1 | 0 |
| 1 - ② | 1 | 0 | 1 | 0 | 0 | 0 | 1 | 0 | 1 | 0 | 0 | 0 |
| 1 - ③ | 1 | 0 | 1 | 0 | 0 | 0 | 0 | 1 | 1 | 0 | 1 | 1 |
| 1 - ④ | 1 | 0 | 1 | 0 | 0 | 0 | 1 | 1 | 1 | 0 | 0 | 1 |

Fig. 4(A)

TRUTH TABLE OF FIRST CONTROL CIRCUIT (2) (Fig. 2)

| | IN THE CASE OF SI = 6 | | | | LOW-ORDER FOUR BITS OF DATA PACKET NUMBER | | | | OUTPUT FROM FIRST CIRCUIT | | | |
|---|---|---|---|---|---|---|---|---|---|---|---|---|
| | b1 | b2 | b3 | b4 | b23 | b24 | b25 | b26 | c1 | c2 | c3 | c4 |
| 2 - ① | 0 | 1 | 1 | 0 | 0 | 0 | 0 | 0 | 0 | 1 | 1 | 0 |
| 2 - ② | 0 | 1 | 1 | 0 | 0 | 0 | 1 | 0 | 0 | 1 | 0 | 0 |
| 2 - ③ | 0 | 1 | 1 | 0 | 0 | 0 | 0 | 1 | 0 | 1 | 1 | 1 |
| 2 - ④ | 0 | 1 | 1 | 0 | 0 | 0 | 1 | 1 | 0 | 1 | 0 | 1 |

Fig. 4(B)

TRUTH TABLE OF SECOND CONTROL CIRCUIT

| SI | $b_1$ | $b_2$ | $b_3$ | $b_4$ | SC2 | SCRAMBLE |
|---|---|---|---|---|---|---|
| 0 | 0 | 0 | 0 | 0 | 0 | NOT SCRAMBLED |
| 1 | 1 | 0 | 0 | 0 | 0 | NOT SCRAMBLED |
| 2 | 0 | 1 | 0 | 0 | 0 | NOT SCRAMBLED |
| 3 | 1 | 1 | 0 | 0 | 0 | NOT SCRAMBLED |
| 4 | 0 | 0 | 1 | 0 | 0 | NOT SCRAMBLED |
| 5 | 1 | 0 | 1 | 0 | 1 | SCRAMBLED |
| 6 | 0 | 1 | 1 | 0 | 1 | SCRAMBLED |
| 7 | 1 | 1 | 1 | 0 | 0 | NOT SCRAMBLED |
| ⋮ | ⋮ | ⋮ | ⋮ | ⋮ | 0 | NOT SCRAMBLED |
| F | 1 | 1 | 1 | 1 | 0 | NOT SCRAMBLED |

Fig. 6

FIRST CONTROL CIRCUIT - TABLE OF STATE TRANSITION

| CLOCK | C1 | C2 | C3 | C4 |
|---|---|---|---|---|
| (PRESET) | 1 | 0 | 1 | 0 |
| 1 | 0 | 1 | 0 | 1 |
| 2 | 1 | 1 | 1 | 0 |
| 3 | 0 | 1 | 1 | 1 |
| 4 | 1 | 1 | 1 | 1 |
| 5 | 1 | 0 | 1 | 1 |
| 6 | 1 | 0 | 0 | 1 |
| 7 | 1 | 0 | 0 | 0 |
| 8 | 0 | 1 | 0 | 0 |
| 9 | 0 | 0 | 1 | 0 |
| 10 | 0 | 0 | 0 | 1 |
| 11 | 1 | 1 | 0 | 0 |
| 12 | 0 | 1 | 1 | 0 |
| 13 | 0 | 0 | 1 | 1 |
| 14 | 1 | 1 | 0 | 1 |
| 15 | 1 | 0 | 1 | 0 |

RETURN

Fig. 9

DATA PROCESSOR FOR FM MULTIPLEX BROADCAST

BACKGROUND OF THE INVENTION (i) Field of the Invention

The present invention relates to an apparatus for scrambling or descrambling in an FM multiplex broadcast, and more specifically, it relates to an apparatus for scrambling or descrambling by the use of data included in a prefix of communication data.

(ii) Description of the Prior Art

In an FM multiplex broadcast, the scrambling of a predetermined service before broadcasting has been investigated. An example of a service which is to be practically scrambled is road traffic information such as traffic jam information, traffic control and accident information provided by the Vehicle Information and Communication System Foundation (hereinafter referred to as "VICS").

For information transfer using FM multiplex broadcast, in addition to the VICS, there have been proposed, for example, services such as a pager and a DGPS (a differential global positioning system). Furthermore, also in Europe and America, the FM multiplex broadcast of a Japanese DARC (data radio channel) system is scheduled to be carried out. Additionally, in Europe and America, it has also been proposed to provide the services of the pager, various items of individual information such as stock prices and the DGPS information, using FM multiplex data. Since these services are basically provided by charged broadcasts, different scrambling is required to be applied to the services including free services which are not scrambled. Accordingly, in the FM multiplex broadcasts of one broadcasting station, the unscrambled broadcasts and the scrambled broadcasts (including plural kinds of scrambling) may exist together.

Thus, in the case where scrambling is applied or is not in applied to the broadcasts in one broadcasting station, they must be distinguished by some means. However, a concrete method for scramble control in such a case has not been proposed. Furthermore, in order to deal with this situation, various methods, such as the utilization of codes for denoting presence/absence of scrambling can be contrived. In such a case, however, various problems exist, and for example, specific mechanisms are necessary on both the transmitter and receiver sides.

Furthermore, if different PN codes for the scrambling are used for the scrambled broadcasts in accordance with the kinds of services (contents of the broadcasts), a user can distinguish the services. Thus, there has been a request that the different PN codes should be used in accordance with the kinds of services, but no concrete method for satisfying this request has been proposed.

The present applicant has disclosed a scrambling and descrambling method suitable for the FM multiplex broadcast in Japanese Patent Application No. 72740/1995. In this system, in the first place, key data included in one part of a data packet is determined on the transmitter side, and a scramble key is generated in accordance with the key data. Next, the scramble key is set to an initial value, and predetermined random numbers are generated. Furthermore, the PN code is created by nonlinear logic which is corrected and controlled by a data packet number. The data is scrambled by the PN code.

On the other hand, the key data or the like is extracted from the transmitted data which is received at the receiver side. In the same way as in the transmitter, the scramble key and the PN code are generated. The data within a predetermined range of the received data packet is descrambled. Accordingly, a suitable scrambling and descrambling processing for the FM multiplex broadcast can be carried out. However, in the previously proposed method, when broadcasts are scrambled and not scrambled at the same broadcasting station, a concrete method for scramble control has not been proposed.

SUMMARY OF THE INVENTION

The present invention has been developed in consideration of the above problems. It is an object of the present invention to provide an apparatus which can reduce a load of a broadcasting station and a receiver, and which can carry out good scramble control.

According to one aspect of the present invention, there is provided a data processor for scrambling or descrambling data at the transmission or reception of an FM multiplex broadcast which comprises a random number generating circuit for determining an initial value in accordance with predetermined scramble key data included in communication data and for generating random numbers, a logic circuit for executing a logic operation on the generated random numbers and the transmitted data or the received data, and a control circuit for controlling the logic operation in the logic circuit in accordance with a scramble identification code included in the communication data. Particularly, a service identification code indicating the service contents of the FM multiplex broadcast is utilized for the scramble identification code.

Here, in the FM multiplex broadcast by a DARC system, as shown in Table 1, the service identification code (hereinafter referred to as "SI") is the information for mainly identifying the contents of a program, and it is included in a prefix of a data packet.

TABLE 1

| Service Identification Code (SI) | Contents |
|---|---|
| 0 | Not defined |
| 1 | General information (sequential reception) |
| 2 | General information level 1 (recording reception) |
| 3 | General information level 2 (recording reception) |
| 4 | Traffic information level 1 |
| 5 | Traffic information level 2 |
| 6 | Traffic information level 3 |
| . | Not defined |
| . | |
| . | |
| D | Additional information |
| E | Optional information |
| F | Application signal |

For example, SI=1, 2, 3 is general information. The information from "watch radio" currently being broadcasted by JFN network belongs to the general information. SI=4, 5, 6 is road traffic information. SI=D is additional information such as a broadcasting station name and time. SI=E is optional information such as a program index data. SI=F is the data to be transmitted in the case that the broadcasting station needs it in the application. Furthermore, the corresponding SI is provided for services such as a pager and DGPS.

Accordingly, the service identification code (SI) indicates the service contents of the FM multiplex broadcast. The scramble control is carried out in accordance with the SI value, whereby the scramble can be controlled in accordance with the service contents. Accordingly, it is not necessary to introduce another new identification code, and the scramble control which reduces the load of the broadcasting station and the receiver can be carried out.

For example, when the general information level 1 identified by SI=2 which is not scrambled and the scrambled traffic information level 2 identified by SI=5 are mixed and transmitted from the same broadcasting station, the transmitter can determine whether or not the information is scrambled in accordance with the content of SI. The receiver can also judge whether or not the information is scrambled in accordance with SI. Furthermore, when the traffic information level 3 identified SI=6 is also scrambled, even if the same scramble key data or the like as SI=5 is used, since the processing in the nonlinear logic circuit is carried out in accordance with the SI, the different scrambling random numbers can be generated.

As described above, according to the present invention, a random number signal for scrambling can be controlled by the service identification code included in the FM multiplex broadcast data. Thus, scrambling which reduces the load of the transmitter and receiver and has such a high security that it is difficult to decode can be carried out. More specifically, a basic format of the FM multiplex broadcast is effectively used, whereby effective scramble control can be carried out.

BRIEF DESCRIPTION OF THE DRAWINGS

FIGS. 4(A) and 4(B) show truth tables for describing an operation of the first control circuit 103 in the embodiment.

FIG. 6 shows a truth table for describing the operation of the second control circuit 104 in the embodiment.

FIG. 9 shows a state transition of the first control circuit shown in FIG. 8.

DETAILED DESCRIPTION OF THE PREFERRED EMBODIMENTS

Next, a suitable embodiment of the present invention will be described below with reference to the accompanying drawings.

"Overall Constitution"

Figure 1:
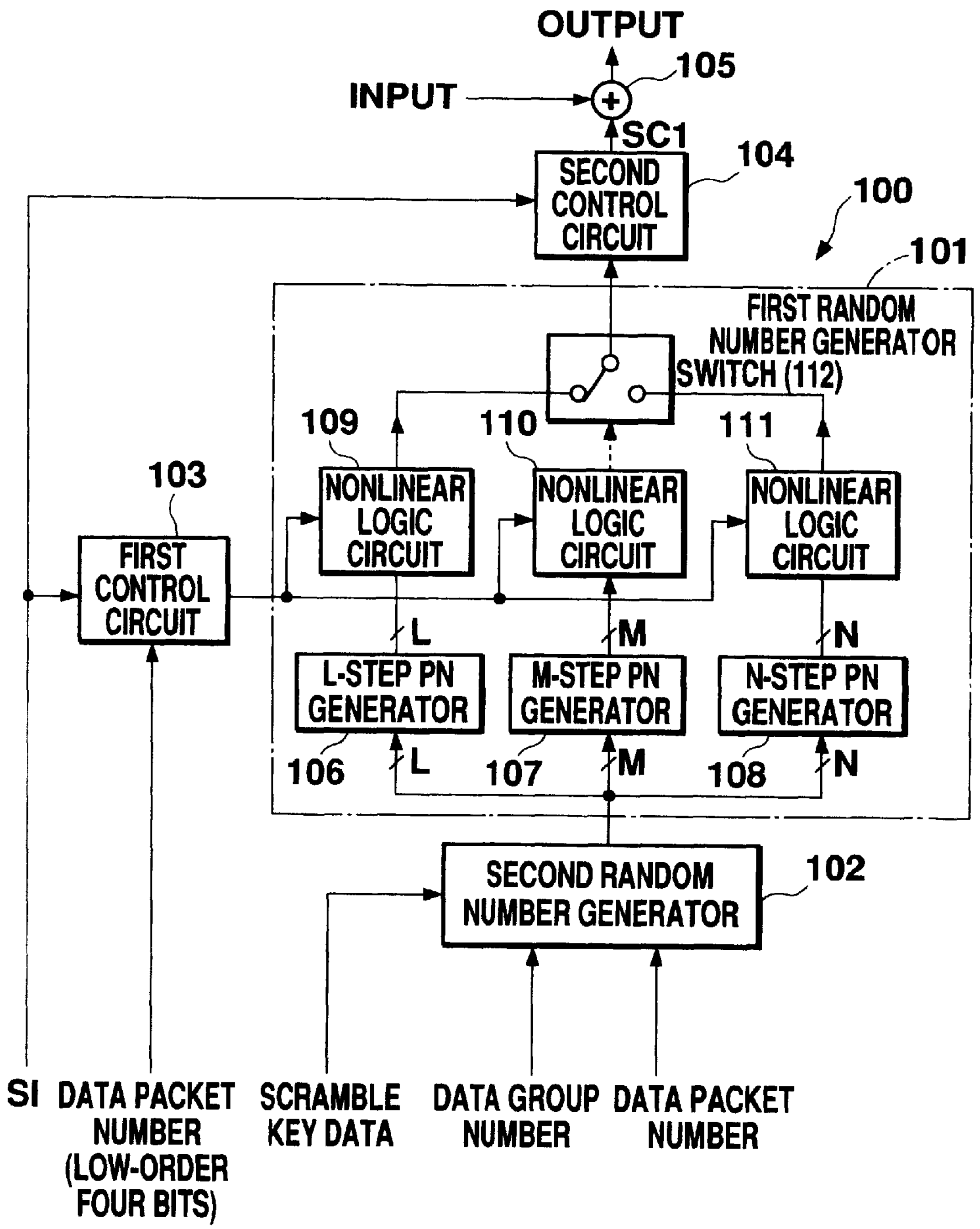
FIG. 1 is a block diagram showing the overall constitution of a data processor 100 in an embodiment of the present invention.

FIG. 1 is a block diagram showing a schematic constitution of a data processor 100 in the embodiment. A first random number generator 101 outputs random numbers for scrambling or descrambling under the control of a first control circuit 103. A second random number generator 102 determines an initial value in accordance with scramble key data included in an FM multiplex broadcasting data, and it generates the random number, that is, a data to be input to the first random number generator 101, in accordance with a data group number and a data packet number included in a prefix. The first control circuit 103 executes an exclusive OR operation of a service identification code (SI) and low-order 4 bits of the data packet number, and supplies its output to nonlinear logic circuits (109 to 111). A second control circuit 104 controls whether the output from the first random number generator 101 is valid or invalid (zero output) in accordance with the service identification code (SI).

A gate circuit 105 executes the exclusive OR operation of the FM multiplex broadcasting data and the output from the second control circuit 104. PN generators 106, 107, 108 generate an L-bit PN signal, an M-bit PN signal and an N-bit PN signal in accordance with the output from the second control circuit 104, respectively. The nonlinear logic circuits 109, 110, 111 receive the outputs from the PN generators 106, 107, 108 and the output from the first control circuit 103 as input signals, and they output a logic operation as a result of the input signals. A switch circuit 112 is controlled by the nonlinear logic circuit 110, and it outputs the PN signal corrected and controlled by the nonlinear logic circuit 109 or 111.

In such circuits, the SI, the data packet number, the data group number and the scramble key data are determined in accordance with the data to be transmitted or the received data, and they are input to the data processor. The second random number generator 102 generates predetermined random numbers in accordance with the scramble key data, the data group number and the data packet number.

In this example, the random numbers generated by the second random number generator 102 are divided into three, and the divided random numbers are supplied to the PN generators 106, 107, 108. The PN generators 106, 107, 108 use one part of the supplied random numbers, and they generate the corresponding PN signal independently.

The outputs from the PN generators 106, 107, 108 are input to the nonlinear logic circuits 109, 110, 111, respectively. The signal from the first control circuit 103 is input to the respective nonlinear logic circuits 109, 110, 111. Each of the nonlinear logic circuits 109, 110, 111 executes a predetermined logical sum of the two signals to be input, and each nonlinear logic circuit outputs a 1-bit signal.

The first control circuit 103 generates the signal from (the low-order 4 bits of) the data packet number. The outputs from the nonlinear logic circuits 109, 110, 111 are different from one another in accordance with the generated signal.

More specifically, if the SI value is different, the output from the first control circuit 103 is different. Accordingly, the outputs from the nonlinear logic circuits 109, 110, 111 are different from one another.

Next, the outputs from the nonlinear logic circuits 109, 110, 111 are input to the switch circuit 112. The switch circuit 112 selects the output from either nonlinear logic circuit 109 or 111 in accordance with the value from the nonlinear logic circuit 110. Accordingly, the 1-bit width random numbers are sequentially output as the output from the first random numbers generator 101 from the switch circuit 112. The random numbers are changed in accordance with the SI value.

Furthermore, the output from the first random number generator 101 is input to the second control circuit 104. The SI is provided for the second control circuit 104. The second control circuit 104 controls whether or not the random numbers from the first random number generator 101 are output in accordance with the SI value.

The output from the second control circuit 104 is provided for the gate circuit 105, and it is processed together with the input data. That is to say, at a transmitter side, the input data is the transmitted data to be scrambled. At a receiver side, the input data is the received data to be descrambled. The random numbers from the second control circuit 104 are processed together with the input data, whereby scrambling or descrambling processing is carried out.

As described above, the second control circuit 104 controls whether or not the random numbers from the first random number generator 101 are output in accordance with the SI value. In the case where the service is not to be scrambled, the second control circuit 104 inhibits the output of the random numbers in accordance with the SI value. Accordingly, the scrambling or descrambling processing is not carried out in the gate circuit 105, and the input data is an output as it is.

On the other hand, according to the SI value, in the case where the service is to be scrambled, the second control circuit 104 provides the random number from the first random number generator 101 for the gate circuit 105. Accordingly, the scrambling or descrambling processing is carried out in the gate circuit 105.

Furthermore, the first control circuit 103 changes the output signal in accordance with the SI value. Accordingly, the random numbers output from the first random number generator 101 are changed in accordance with the SI value. Thus, the random numbers to be used for the scrambling processing can be easily changed in accordance with the contents of the service.

"First Control Circuit and Nonlinear Logic Circuit"

Figure 2:
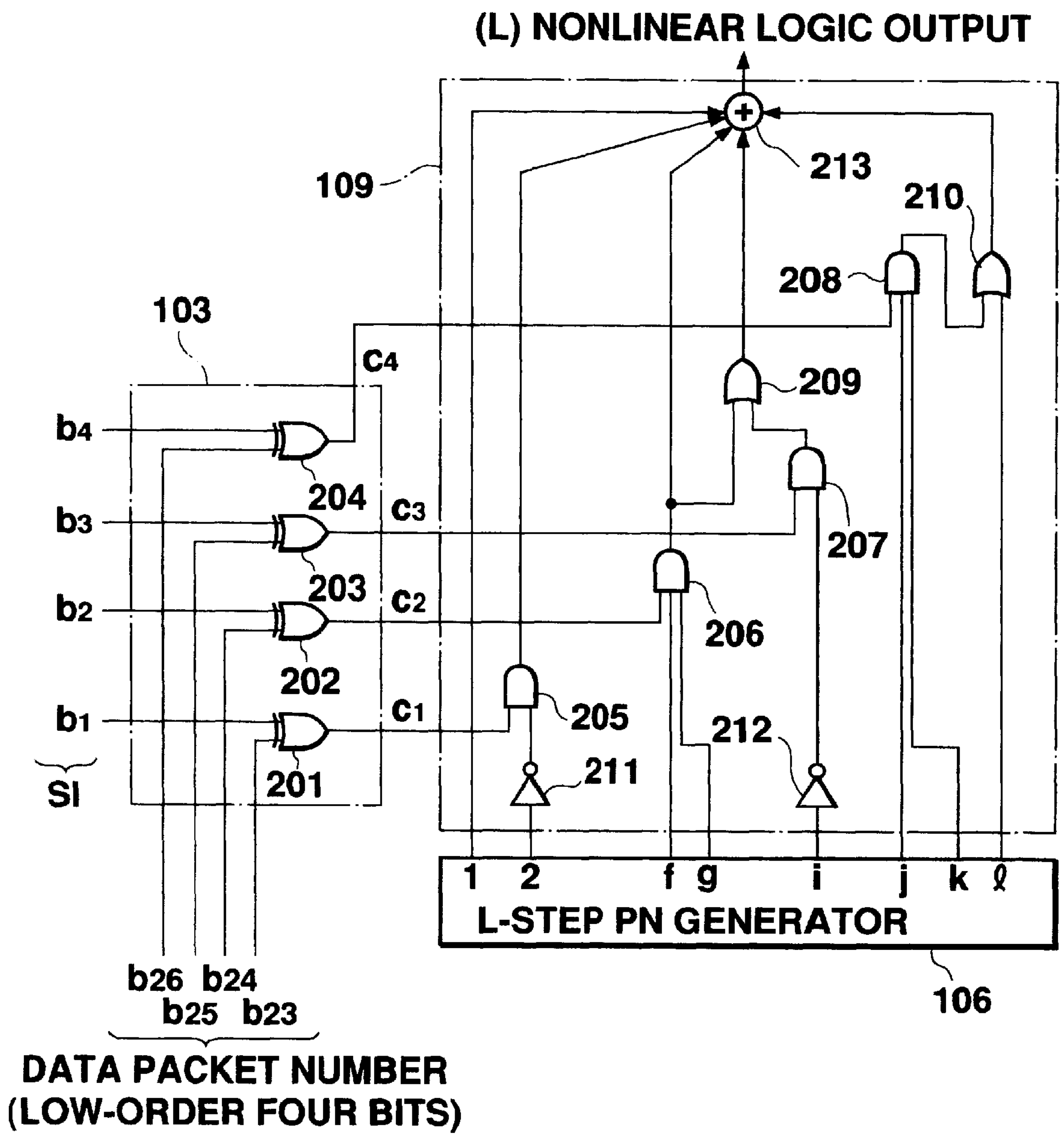
FIG. 2 shows a concrete circuit example of a first control circuit 103 and a nonlinear logic circuit 109 in the embodiment.

FIG. 2 shows a concrete circuit example of the first control circuit 103 and the nonlinear logic circuit 109. Note that the nonlinear logic circuits 110 and 111 may also be the same as the nonlinear logic circuit 109.

The first control circuit 103 comprises four exclusive OR circuits 201, 202, 203, 204. The 4-bit service identification codes (b1, b2, b3, b4) and the low-order four bits (b23, b24, b25, b26) of the data packet number are input to each of the exclusive OR circuits 201, 202, 203, 204, respectively. Each of the exclusive OR circuits executes the exclusive OR, and it outputs C1, C2, C3, C4. Accordingly, the outputs C1, C2, C3, C4 are determined in accordance with the SI value and (the low-order four bits of) the data packet number value, respectively.

Four AND gates 205, 206, 207, 208 are disposed in the nonlinear logic circuit 109, and they execute a logical product of the signal in the nonlinear logic circuit 109 and the outputs C1, C2, C3, C4. The AND gate 205 executes an AND of the output C1 and the inverted signal, that is, the second-bit signal from the PN generator 106 inverted by an inverter 211. The AND gate 206 executes the AND of the output C2 and the f-bit and g-bit signals from the PN generator 106. The AND gate 207 executes the AND of the output C3 and the inverted signal, that is, the i-bit signal from the PN generator 106 inverted by an inverter 212. The AND gate 208 executes the AND of the output C4 and the j-bit and k-bit signals from the PN generator 106.

Furthermore, the outputs from the AND gates 206, 207 are input to an OR gate 209. The output from the AND gate 208 and the first-bit signal from the PN generator 106 are input to an OR gate 210.

The first-bit signal from the PN generator 106, the outputs from the AND gates 205, 206 and the outputs from the OR gates 209, 210 are input to an exclusive OR circuit 213. The exclusive OR of the five signals is executed in the exclusive OR circuit 213, and it is output from the nonlinear logic circuit 109. In such a logic operation, the output from the PN generator 106 is modified in accordance with the SI value.

"Data Packet"

Figure 3:
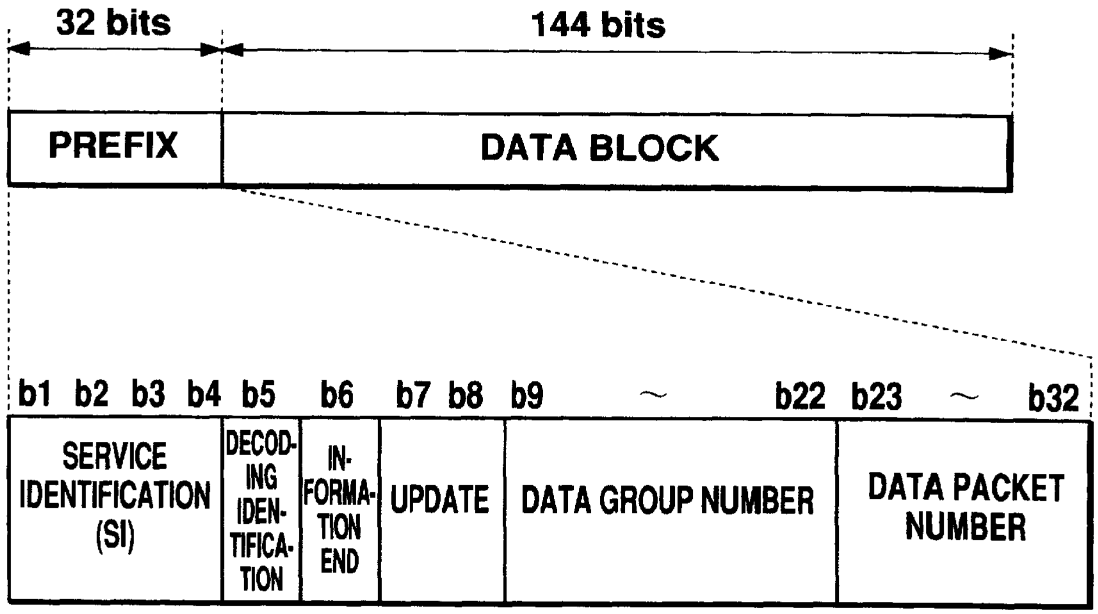
FIG. 3 shows a constitutional example of a data packet.

FIG. 3 shows a constitutional example of the data packet. As shown in FIG. 3, a 176-bit data packet comprises a prefix portion having a head of 32 bits (b1 to b32) and a data block portion having a tail of 144 bits.

B1 to b4 in the prefix portion indicate the service identification number (SI), b9 to b22 indicate the data group number, and b23 to b32 indicate the data packet number.

At the transmitter side, the SI, the data group number and the data packet number are determined in accordance with the data to be transmitted, and they are used so that the scrambling random numbers corresponding to the data packet are generated. On the other hand, at the receiver side, the SI, the data group number and the data packet number are extracted from the prefix of the received data, and they are used so that the scrambling random numbers corresponding to the data packet are generated. Note that the scramble key data is also described at such a portion as to not be scrambled.

"Operation of the First Control Circuit"

FIGS. 4(A) and 4(B) are truth tables for describing the operation of the first control circuit 103 shown in FIG. 2. In this example, since the different scramble processing is carried out in the case of SI=5 and SI=6, the outputs (C1, C2, C3, C4) from the first control circuit in the case of SI=5 and SI=6 are shown in FIGS. 4(A) and 4(B). Note that FIGS. 4(A) and 4(B) show such a case where there are only four kinds of the low-order four bits of the data packet number.

Thus, in the case of SI=5, four other kinds of outputs (C1, C2, C3, C4) are obtained. In the case of SI=6, another further four kinds of outputs (C1, C2, C3, C4) are obtained. It can seen that all the outputs are different from one another.

Accordingly, if the SI values 5 and 6 are input to the nonlinear logic circuits 109, 110, 111, the different outputs can be naturally obtained from the nonlinear logic circuits.

"Second Control Circuit"

Figure 5:
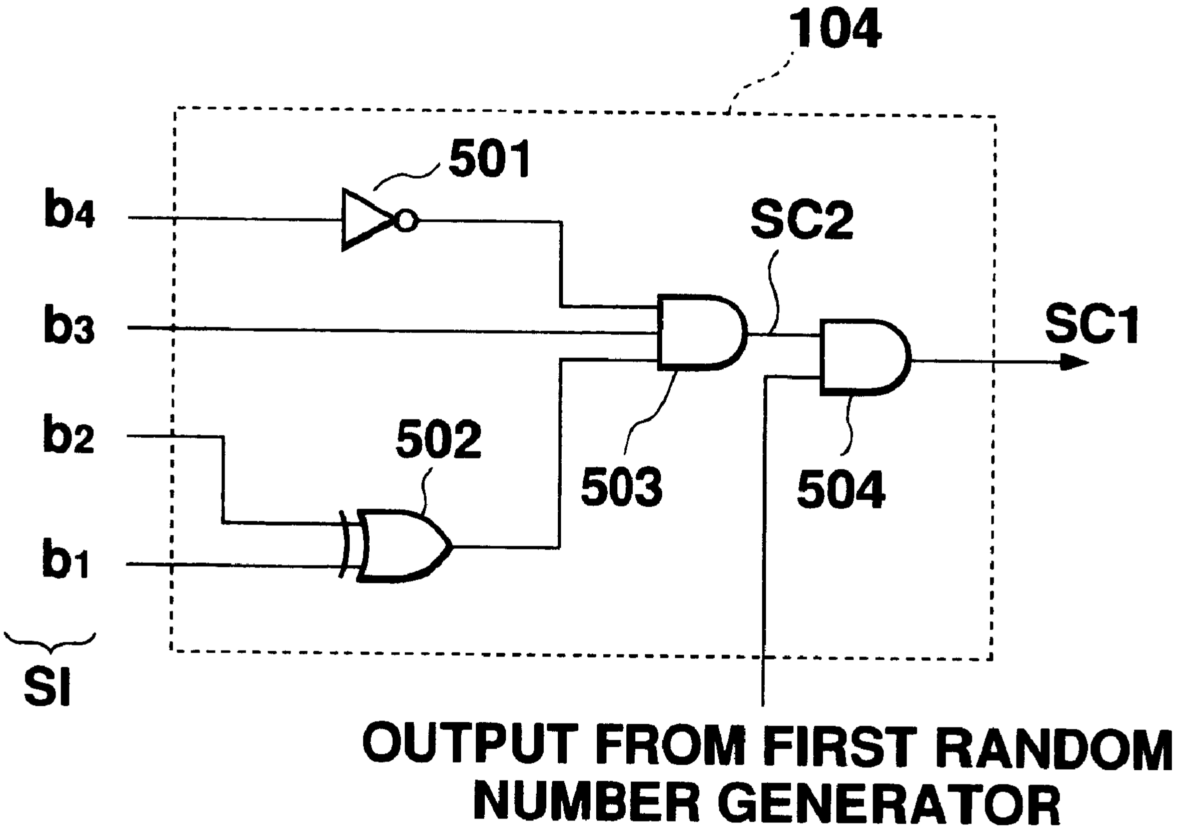
FIG. 5 shows a concrete constitutional example of a second control circuit 104 in the embodiment.

FIG. 5 shows a concrete circuit example of the second control circuit 104. The second control circuit 104 comprises an inverter 501, an exclusive OR circuit 502 and AND gates 503, 504. B1 and b2 in SI are input to the exclusive OR circuit 502, and the output is input to the AND gate 503. Furthermore, b3 is input to the AND gate 503 as it is. B4 is inverted by the inverter 501, and it is input to the AND gate 503. Moreover, the AND gate 503 executes the AND of the input three signals, and it outputs an output signal SC 2.

The output SC 2 from the AND gate 503 and the output from the first random number generator 101 are input to the AND gate 504, and the AND gate 504 executes the AND of both these outputs.

FIG. 6 is a truth table for describing the operation of the second control circuit. In this example, since SC 2=0 is obtained except for the case of SI=5 and SI=6, the output SC 1=0 is naturally obtained. Furthermore, in the case of SI=5 and SI=6, SC 2=1 is obtained, so that SC 1=(the output from the first random number generator) is obtained. Accordingly, in the exclusive OR circuit 105, in the case of SI=5, 6, the scrambling or descrambling processing is carried out.

"Overall Constitution of the System"

Figure 7:
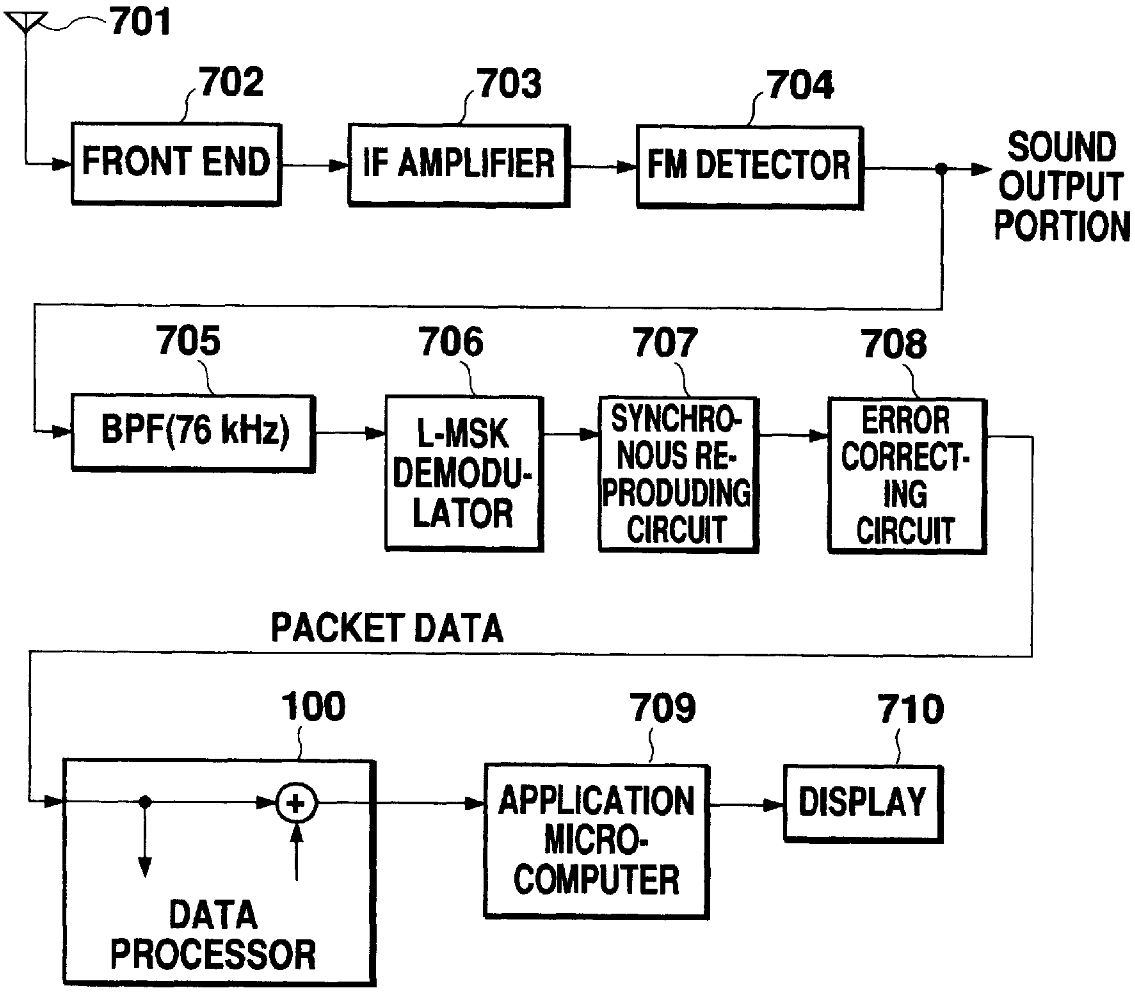
FIG. 7 is a block diagram of an FM multiplex broadcasting receiver using the data processor in the embodiment.

FIG. 7 is a block diagram of an FM multiplex broadcast receiver using the data processor in the embodiment. FIG. 7. shows an application example of the descrambling processing at the receiver side. It should be noted that the scrambling processing at the transmitter side of a broadcasting station is also substantially the same as the above method. That is, in the case of transmission, the output from the data processor is modulated and transmitted. In the case of reception, the received data is processed together with the random numbers so as to be descrambled.

In the first place, the signal which is transmitted from a desired station and received by an antenna 701 is extracted as an intermediate frequency (IF) signal at a front end 702. The signal is amplified in an IF amplifier 703, and it is detected in an FM detector 704. A usual FM broadcasting signal is output from the FM detector 704. On the other hand, the detected signal is also supplied to a 76-kHz band pass filter (BPF) 705, and an FM multiplex data signal is extracted. The signal output from the band pass filter 705 is demodulated in an L-MSK demodulating portion 706. The demodulated signal is regenerated in a synchronous reproducing circuit 707, and an error of the generated signal is corrected in an error correcting circuit 708. The corrected signal is supplied to the data processor 100 as the packet data. As described above, the descrambling processing is carried out.

The output from the data processor 100 is supplied to an application microcomputer 709, where a necessary processing is carried out. The received FM multiplex data is displayed in a display 710.

"Another Constitutional Example of the First Control Circuit"

Furthermore, in the above example, the first control circuit 103 is constituted of the four exclusive OR circuits, but this constitution is not restrictive. The first control circuit 103 may be constituted of a combination of the AND gate, the OR gate and the like, or a combination of a flip-flop circuit and the OR gate.

Figure 8:
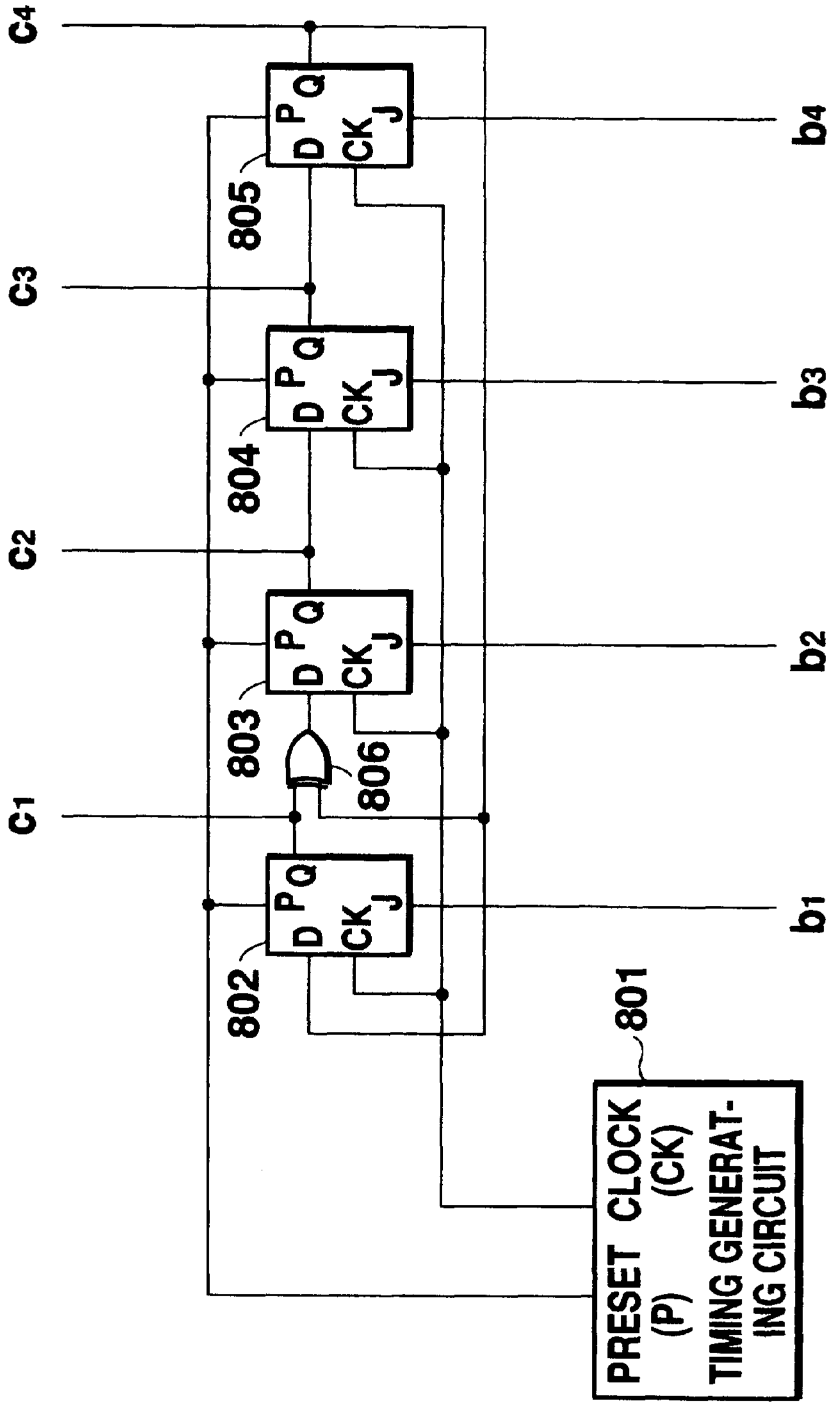
FIG. 8 shows another constitutional example of the first control circuit in the embodiment.

FIG. 8 shows another constitutional example (example 2) of the first control circuit 103. In this example, the signals C1, C2, C3, C4 controlled by the SI alone are output. That is to say, this circuit is a PN generating circuit (x4+x+1) in which the SI value is defined as the initial value.

The first control circuit 103 comprises a timing generating circuit 801, flip-flop circuits 802, 803, 804, 805 and an exclusive OR circuit 806.

The timing generating circuit 801 supplies a preset clock P which sets an initial timing (a timing in synchronization with the first random number generator 101) for generating the data and a clock CK in synchronization with a data clock to each preset terminal and clock input terminal of each flip-flop circuit 802 to 805. Furthermore, b1 to b4 in the SI is supplied to each initial value input terminal of each flip-flop circuit 802 to 805. Moreover, C1 to C4 are output from the flip-flop circuits 802 to 805, respectively.

The output from the flip-flop circuit 805 is input to a data input terminal of the flip-flop circuit 802. The output from the flip-flop circuit 802 is input to the exclusive OR circuit 806. The output from the flip-flop circuit 805 is also input to the exclusive OR circuit 806. The exclusive OR of both the signals is executed in the exclusive OR circuit 806, and the output from the exclusive OR circuit 806 is input to the flip-flop circuit 803. The output from the flip-flop circuit 803 is input to the flip-flop circuit 804. The output from the flip-flop circuit 804 is input to the flip-flop circuit 805.

In such a constitution, for example, if SI=5 (b1=1, b2=0, b3=1, b4=0) is preset to the initial value, the output states (C1, C2, C3, C4) are changed whenever the clock CK is input. At a first clock, the outputs (C1, C2, C3, C4) are (0, 1, 0, 1). At a second clock, the outputs (C1, C2, C3, C4) are (1, 1, 1, 0). At a sixteenth clock, the output states return to those of the first clock.

FIG. 9 shows a state transition table of the first control circuit 103 in such a constitution.

"Other Constitutions"

Furthermore, in an embodiment of FIG. 1, the nonlinear logic circuits 109, 110, 111 are controlled by the same first control circuit 103, but these nonlinear logic circuits 109, 110, 111 may also be controlled without any problem by a different first control circuit 103.

What is claimed is:

1. A data processor for scrambling or descrambling communication data transmitted in an FM multiplex broadcast, comprising a random number generating circuit for determining an initial value in accordance with scramble key data included in the communication data and for generating random numbers, a logic circuit for executing a logic operation on the generated random numbers and the communication data, and a control circuit for controlling whether or not a logic operation of the random numbers and the communication data is executed in the logic circuit in accordance with a scramble identification code included in a service identification code indicating the service contents of the FM multiplex broadcast.

2. The data processor according to claim 1 wherein the data processor scrambles transmitted data, the random numbers generating circuit determines an initial value in accordance with scramble key data included in the transmitted data, the logic circuit scrambles transmitted data by a logic operation of the generated random numbers and the transmitted data, and the control circuit controls whether or not the scrambling is executed in the logic operation circuit in accordance with scramble identification data included in the transmitted data.

3. The data processor according to claim 1 wherein the data processor scrambles received data, the random number generating circuit determines an initial value in accordance with scramble key data included in the received data, the logic circuit scrambles the received data by a logic operation of the generated random numbers and the received data, and the control circuit controls whether or not the scrambling is executed in the logic operation circuit in accordance with scramble identification data included in the received data.

4. The data processor according to claim 1 wherein the service identification code is included in a prefix of a portion which is not a target of scrambling in a data packet of the communication data in the FM multiplex broadcast.

5. The data processor according to claim 1 wherein the logic circuit is an exclusive OR circuit which computes an exclusive OR of random numbers generated in the random number generating circuit and the communication data.

6. The data processor according to claim 1 wherein the control circuit changes the random numbers generated in the random number generating circuit in accordance with contents of the service identification code.

7. The data processor according to claim 6 wherein the random number generating circuit has a second random number generating circuit for generating random numbers by the utilization of the scramble key data, a PN signal generating circuit for generating a PN signal of plural bits in accordance with the second random numbers generated from the second random number generating circuit, and a nonlinear logic circuit for executing a predetermined logic operation by using, as an input, the PN signal from the PN signal generating circuit, and the control circuit changes the logic operation in the nonlinear logic circuit in accordance with the service identification code.

8. The data processor according to claim 7 wherein the second random number generating circuit generates the random numbers in accordance with the scramble key data, and a data group number and a data packet number which are numbers per predetermined unit of the data included in a prefix in a data packet in the FM multiplex broadcast.

9. The data processor according to claim 7 wherein the control circuit has a gate circuit which uses, as input signals, the service identification code and the data packet number for specifying the data packet, and controls the logic operation of the nonlinear logic circuit in accordance with the output from this gate circuit.

10. The data processor according to claim 9 wherein the gate circuit comprises an exclusive OR circuit which computes an exclusive OR of the service code and the data packet number.

11. An FM multiplex broadcast system which transmits scrambled communication data and which carries out descrambling on a receiving side, wherein a broadcasting station introduces a service identification code indicating service contents of the FM multiplex broadcast into the communication data, and controls whether or not the scrambling is executed in accordance with this service identification code, and the receiving side controls whether or not the descrambling is carried out in accordance with the service identification code of the received communication data.

12. The FM multiplex broadcast system according to claim 11 wherein the broadcasting station determines a scramble key, introduces the determined scramble key into the communication data, generates random numbers in accordance with the scramble key, and scrambles the communication data by executing a logic operation on the random numbers and the communication data, and the receiving side extracts the scramble key from the communication data, generates the random numbers in accordance with the scramble key, and descrambles the communication data by executing a logic operation of the generated random numbers and the communication data.

13. A data processing method for scrambling or descrambling communication data transmitted in an FM multiplex broadcast, comprising generating first random numbers using scramble key data and prefix data included in the communication data;

executing a logic operation on the generated first random numbers and the communication data; and controlling whether or not a logic operation of the first random numbers and the communication data is executed in accordance with a scramble identification code included in a service identification code indicating the service contents of the FM multiplex broadcast.

14. The method of claim 13, wherein the logic operation is a scrambling of communication data to be transmitted.

15. The method of claim 13, wherein the logic operation is a descrambling of received communication data.

16. The method of claim 13, wherein the service identification code is included in a prefix of a portion which is not a target of scrambling in a data packet of the communication data in the FM multiplex broadcast.

17. The method of claim 13, wherein the step of generating the first random numbers includes:

generating second random numbers using the scramble key data;

generating a PN signal of plural bits in accordance with the second random numbers; and executing a predetermined logic operation using the PN signal by a nonlinear logic circuit to generate the first random numbers, and wherein the controlling step includes changing the logic operation of the nonlinear logic circuit in accordance with the service identification code.

18. The method of claim 17, wherein the second random numbers are generated in accordance with the scramble key data, and a data group number and a data packet number which are numbers per predetermined unit of the data included in a prefix in a data packet in the FM multiplex broadcast.

* * * * *